United States Patent [19]

Fogelson

[11] Patent Number: 4,509,289
[45] Date of Patent: Apr. 9, 1985

[54] APPARATUS FOR STABILIZING PLANT SUPPORT STAKES IN POTS

[75] Inventor: Seymour Fogelson, 19841 Redwing St., Woodland Hills, Calif. 91364

[73] Assignee: Seymour Fogelson, Woodland Hills, Calif.

[21] Appl. No.: 95,635

[22] Filed: Nov. 19, 1979

[51] Int. Cl.³ .............................................. A01G 9/12
[52] U.S. Cl. ..................................... 47/70; 47/41.13; 47/47; 248/519
[58] Field of Search .................. 47/47, 70, 41.13, 45, 47/41.11, 41; 248/529, 519, 174; 211/73

[56] References Cited

U.S. PATENT DOCUMENTS

| 1,108,432 | 8/1914 | Foster | 211/73 |
| 1,747,628 | 2/1930 | Hagel | 248/174 |
| 2,005,928 | 6/1935 | Beghetti | 47/66 X |
| 2,893,169 | 7/1959 | Shepherd | 47/47 |
| 3,554,473 | 1/1971 | Rakou et al. | 248/519 |
| 4,117,628 | 10/1978 | Smith | 47/70 X |

FOREIGN PATENT DOCUMENTS

| 1585530 | 1/1970 | France | 47/41.11 |
| 342400 | 12/1959 | Switzerland | 47/47 |
| 229931 | 3/1925 | United Kingdom | 47/41.11 |
| 344032 | 3/1931 | United Kingdom | 47/41.13 |
| 664259 | 1/1952 | United Kingdom | 47/41.13 |

Primary Examiner—Steven A. Bratlie
Attorney, Agent, or Firm—Charles H. Schwartz; Ellsworth R. Roston

[57] ABSTRACT

Apparatus for stabilizing plant support stakes in a pot includes means spaced vertically and partially defining first and second loops for receiving and holding the plant. Means spaced vertically partially define third and fourth loops for receiving and holding the stake. A spacer member is between the first and second loops and the third and fourth loops. Means brace the loops in fixed relationship to the spacer member.

In one embodiment, the bracing means includes a first brace disposed between the first and second loops and a second brace disposed between the third and fourth loops. The third and fourth loops may be respectively disposed within the first and second loops in the planar relationship and may be pivotable from this planar relationship to form the loops. The spacer member and the loops may be open to facilitate the circulation of air and water through the pot and to permit the roots of the plant to spread.

In a second embodiment, the first and second partial loops respectively define complete loops with the third and fourth partial loops. The first and third partial loops may be supported near one end of the spacer member and the second and fourth loops may be supported near the opposite end of the spacer member. The bracing means may include a pair of braces extending between the loops. A wall spaced from the spacer member defines a receptacle with the spacer member and the braces for receiving and holding the stake.

14 Claims, 7 Drawing Figures

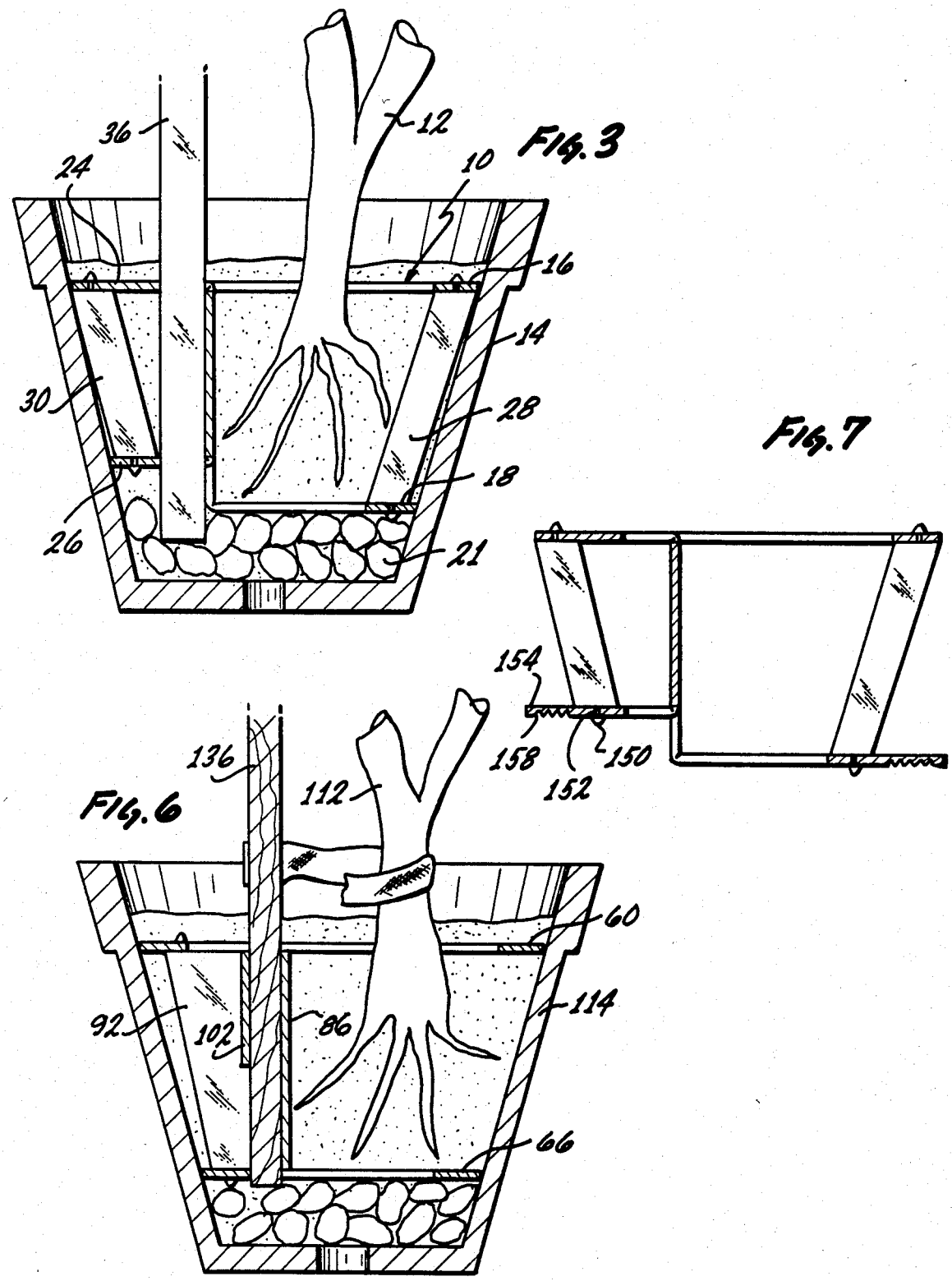

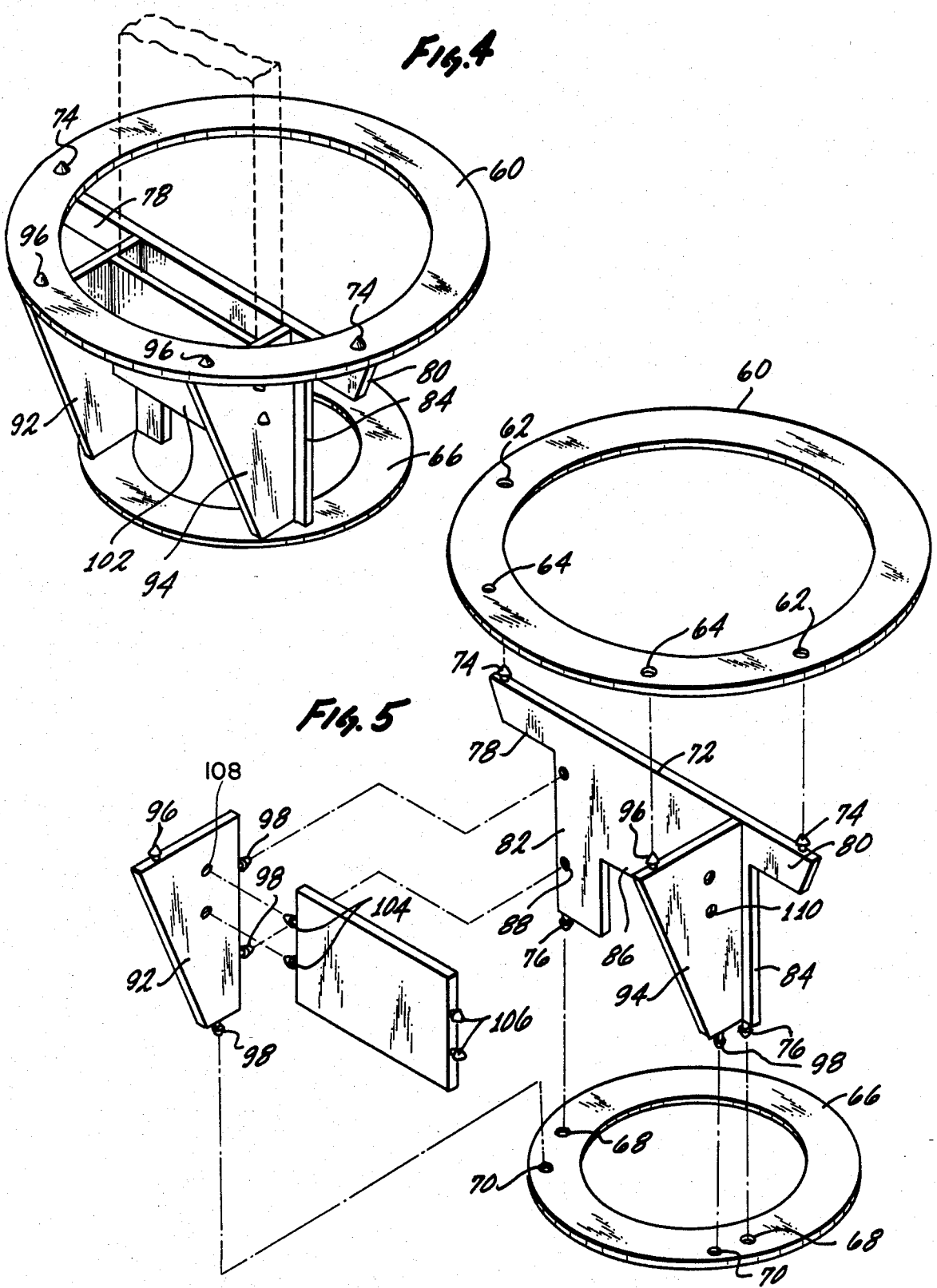

APPARATUS FOR STABILIZING PLANT SUPPORT STAKES IN POTS

This invention relates to apparatus for stabilizing plant support stakes in pots. More particularly, the invention relates to apparatus which is made from a minimal number of parts and which is easily assembled to provide for stabilizing plant support stakes in pots. The invention is especially concerned with arrangements for stabilizing plant support stakes in pots in such a way that the plants will have a full opportunity to grow and flourish.

When plants are first planted in pots, they are young and tender. Accordingly, it is often important that the plants be supported in some way in the pots until they have established roots in the pots and can support themselves in the pots. In this way, the plants can grow into mature plants which will blossom or fruit and give optimum benefit to the owner and those viewing or taking care of the plants. In addition, in fruit bearing plants it is essential, to prevent rot damage, that the fruit be kept from contact with the ground. This invention prevents such an occurrence.

The support of plants in pots has been known for decades and probably as long as hundreds of years. Various attempts have been made throughout the years to provide a convenient arrangement for stabilizing plant support stakes in pots to assure that the plants will have an optimal opportunity to grown and flourish and that the support stakes will not tilt. However, in spite of such continual efforts for such a long period of time, difficulties still remain. For example, an arrangement is still not available for providing an easy, efficient and tilt-proof staking of plants in pots. As a result, plants often do not have a full opportunity to become rooted after they have been placed in the pots.

In hydroponic gardening it is possible to grow potted plants in a medium consisting only of water and nutrients. Plant stem support is not possible under these circumstances; however, with the support system as set forth herein plants can be grown without the need of aggregate for root attachment and thus stem support. This savings of energy spent in root attachment will be directly translated into increased vertical growth of the plant and thus, earlier maturation.

This invention provides an arrangement for overcoming the difficulties discussed above. The arrangement is made from a minimal number of parts and is easily assembled to provide for stabilizing plant support stakes in pots. Furthermore, the invention stabilizes the plant support stakes in the pots in an efficient manner so that the plants are held firmly in position in the pots while at the same time having an optimal opportunity to grow roots in the pots. The arrangement also provides for a full circulation of air, water and nutrients in the pots so that the root system of the plants will have an opportunity to expand.

The arrangement of this invention includes means spaced vertically and partially defining first and second loops for receiving and holding a plant. Means are also spaced vertically to partially define third and fourth loops for receiving and holding the stake. A spacer member is disposed between the first and second loops and the third and fourth loops to complete the definition of these loops. Means brace the loops in fixed relationship to the spacer member.

In one embodiment, the bracing means includes a first brace disposed between the first and second partial loops and a second brace disposed between the third and fourth partial loops. The first, second, third and fourth loops may form a single member with the spacer member and may be pivotable from a planar relationship with the single member to form the loops. The third and fourth loops may be respectively disposed within the first and second loops in the planar relationship. The spacer member and the first, second, third and fourth loops may be open to facilitate the circulation of air, water and nutrients through the pot and to allow for expansion of the root system.

In a second embodiment, the first and third partial loops are respectively continuations of the second and fourth partial loops to define complete loops. The first and third partial loops may be supported at one end of the spacer member and the second and fourth loops may be supported at the other end of the spacer member. The bracing means may include a pair of braces extending between the spacer member and the second and fourth partial loops at spaced positions along the loops. A positioning wall may be spaced from the spacer member to define a receptacle with the spacer member and the braces for receiving and holding the stake.

In the drawings:

FIG. 3 is a sectional view in elevation of the arrangement shown in FIGS. 1 and 2 in a pot with a plant and a stake also disposed in the pot;

FIG. 4 is a perspective view of a second embodiment of the invention;

FIG. 5 is a perspective view in partially assembled form of the embodiment shown in FIG. 4 and illustrates in broken lines how the different parts are moved to obtain their assembled relationship;

FIG. 6 is a sectional view in elevation of the embodiment shown in FIGS. 4 and 5 in a pot with a plant and a stake disposed in the pot; and FIG. 7 is a sectional view in elevation of a modification of the embodiment shown in FIG. 3.

Figure 1:
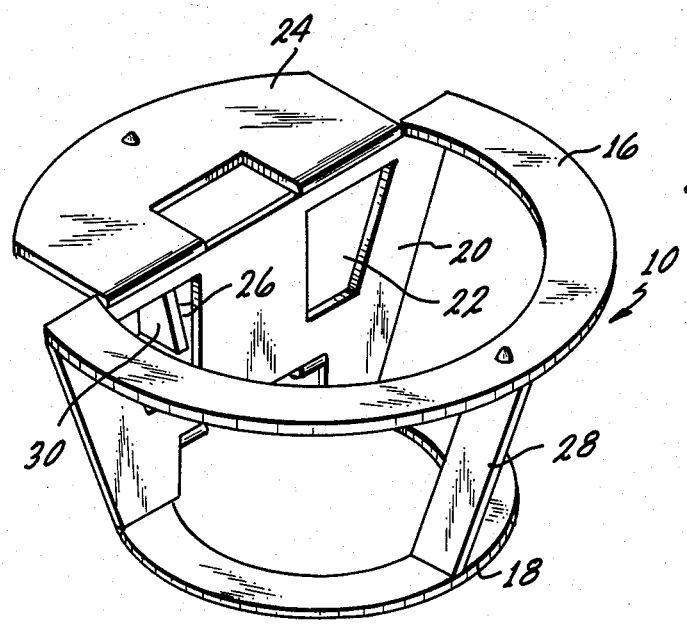
FIG. 1 is a perspective view of an arrangement constituting one embodiment of an invention for staking a plant in a pot.
Figure 2:
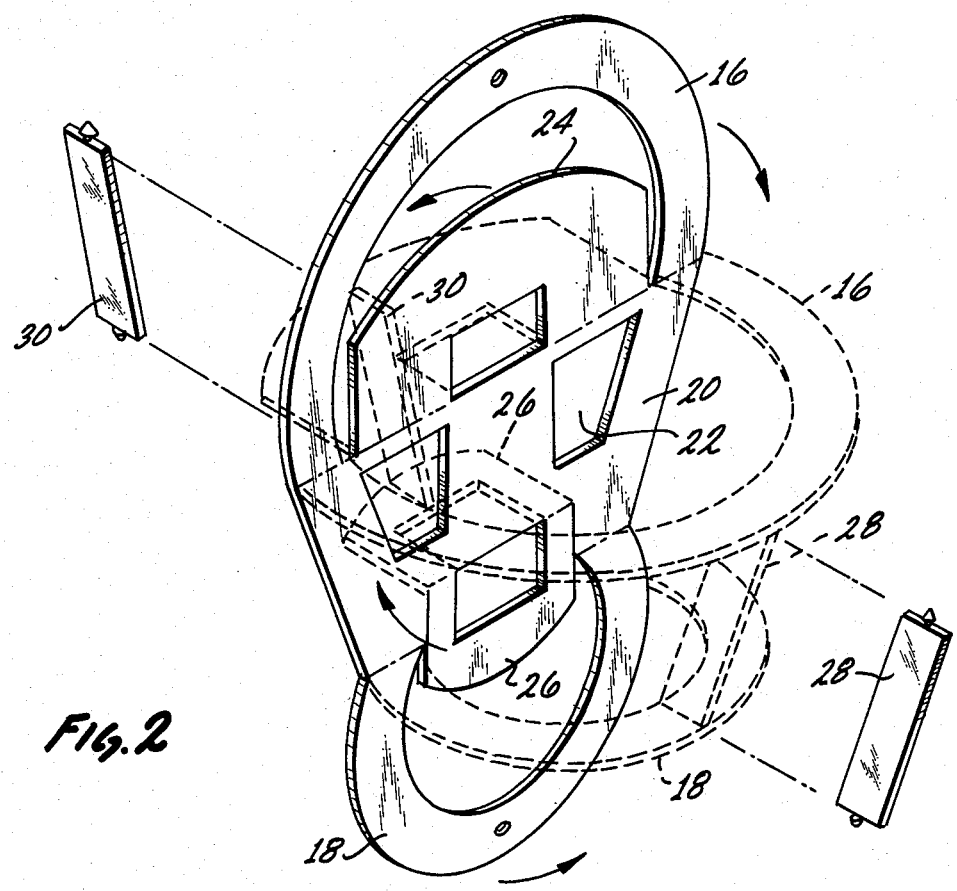
FIG. 2 is an exploded perspective view of the parts forming the arrangement shown in FIG. 1.

In one embodiment of the invention, apparatus generally indicated at 10 is provided for stabilizing a stake 36 in a pot 14. The apparatus 10 includes first and second partial loops 16 and 18 respectively spaced vertically from each other. The partial loops 16 and 18 define loops with a spacer member 20 which is preferably disposed vertically at an intermediate position in the pot. The loop defined by the partial loop 16 and the spacer member 20 preferably has a greater diameter than the loop defined by the partial loop 18 and the spacer member 20. The loop defined by the partial loop 18 and the spacer member 20 is adapted to rest on the bottom of the pot or on rocks or stones 21 at the bottom of the pot to facilitate the passage of excess water from the pot. The spacer member is provided with openings 22. The apparatus 10 also includes partial loops 24 and 26 spaced vertically from each other. Each of the partial loops 24 and 26 also defines a loop with the spacer member 20. The loop defined by the partial loop 26 and the spacer member 20 is adapted to rest on the side wall of the pot. The loops defined by the partial loops 24 and 26, respectively, and the spacer member 20 have the same diameter as the loops defined by the partial loops 16 and 18, respectively, and the spacer member 20.

A brace 28 is disposed between the partial loops 16 and 18 to support the partial loops in a fixed relationship to each other. Similarly, a brace 30 is disposed between the partial loops 24 and 26 to support the partial loops in a fixed relationship to each other. Each of the braces 28 and 30 may be made from a planar member to define large openings between their associated pair of partial loops.

The plant 12 is disposed in the pot 14 by extending the plant through the partial loop 16 and extending and packing soil loosely around the plant. A stake 36 is extended into the pot through the partial openings in the loop 26 and the loop 24. The plant 12 is then tied to the stake 36 to hold the plant firmly in place in the pot. The firm disposition of the stake, and thus of the plant, in the pot is facilitated by the positioning of the loops 16, 18, 24, and 26 provided by the spacer 20 and braces 28 and 30.

A free circulation of air, water and nutrients in the pot is facilitated by the openings 22 in the spacer member 20 and by the open relationship provided by the braces 28 and 30. This free circulation of air, water and nutrients encourages the formation of a hardy root system in the plant and facilitates optimal growth of the plant. It also encourages the soil in the plant to shift in accordance with the growth of the plant root system.

The spacer member 20 may form a single member with the partial loops 16 and 18 and the partial loops 24 and 26. All of the loops may occupy a single plane with the spacer member before the apparatus is assembled for disposition in the pot 14. In such a planar relationship, the partial loops 24 and 26 are respectively disposed within the partial loops 16 and 18.

When it is desired to form the arrangement for staking the plant 12 in the pot 14, the partial loops 16 and 18 and the partial loops 24 and 26 are pivoted to a substantially perpendicular relationship with the spacer member 20. The braces 28 and 30 are then inserted to maintain the partial loops in fixed relationship to each other and the assembled arrangement is then inserted into the pot.

FIGS. 4, 5 and 6 illustrate a second embodiment of the invention. In this embodiment, a flat ring 60 is provided with a pair of opposed holes 62 and with a pair of holes 64 disposed at one end between the hole 62. A flat ring 66 is also provided with a pair of opposed holes 68 and with a pair of holes 70 positioned to correspond with the holes 64. The ring 66 may be provided with a smaller diameter than the ring 60.

A spacer member 72 is provided at opposite ends with raised detents 74 and 76 to mate respectively with the holes 62 and 68. The spacer member is provided with a pair of horizontal support portions 78 and 80 which abut the ring 60 in the assembled relationship. A pair of vertical legs 82 and 84 respectively extend from the support portions 78 and 80. A cross bar 86 extends between the legs 82 and 84 at an intermediate position along the heigth of the legs. Holes 88 and holes (not shown) are respectively provided in the legs 82 and 84.

A pair of braces 92 and 94 are provided at opposite ends with raised detents 96 and 98 to mate respectively with the holes 64 and 70 in the rings 60 and 66. The braces 92 and 94 respectively have raised detents 98 which extend into the holes 88 and the holes (not shown) in the legs 82 and 84. A positioning member 102 has raised detents 104 and 106 which respectively extend into holes 108 and 110 in the braces 92 and 94.

The embodiment shown in FIGS. 4, 5 and 6 is assembled by initially disposing the detents 104 and 106 in the holes 108 and 110. The detents 98 and (not shown) are then disposed in the holes 88 and (not shown). Pegs 74 and 96 are then disposed in the holes 62 and 64. The detents 76 and 98 are then respectively disposed in the holes 68 and 70.

The embodiment shown in FIGS. 4, 5 and 6 and described above has a primary compartment for receiving a plant 112. This primary compartment is defined primarily by the spacer member 72 and the partial loops of the rings 60 and 66 to the right of the spacer member in the drawings. The embodiment also has a secondary compartment for receiving a stake 136. This compartment is defined primarily by the spacer member 72, the positioning member 102, the braces 92 and 94 and the partial loops of the rings 60 and 66 to the left of the spacer member in the drawings. The plant 112 is able to become rooted in substantially all of the pot because of the openings provided by the spacer 72 between the primary and secondary compartments.

FIG. 7 illustrates a modification of the invention. In such a modification, barbs such as at 150 are provided on certain members to pass through holes 152 in other members to provide a retention between the members in their assembled relationship. Furthermore, a member 154 near the bottom of the assembly may be provided with a serrated configuration as at 158. By breaking the member 154 at one of the serrations 158, a relatively easy adjustment can be provided in the length of the apparatus at a position near the bottom of the apparatus. This allows the apparatus to be adjusted for pots with different slopes in their side surface and minimizes the different models that nurseries and retail stores may have to carry for their customers.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:
1. In combination for staking a plant in a pot,
means defining a spacer member for disposition at an intermediate position in the pot,
means defining with the spacer member first and second loops at a pair of vertically spaced positions to receive and hold the plant, the second loop being disposed substantially directly below the first loop and being provided with a reduced diameter relative to that of the first loop wherein, the means defining the first and second loops and the spacer member are formed from a single member and the single member is pivotable at first particular positions to form the first and second loops, and
means defining with the spacer member third and fourth loops at a pair of positions directly below each other and respectively disposed in horizontally disposed relationship to the first and second loops to receive and hold the stake wherein, the third and fourth loops are disposed on the opposite side of the spacer member from the first and second loops.

2. The combination set forth in claim 1 wherein
the means defining the third and fourth loops are formed from the single member and the single member is pivotable at second particular positions to form the third and fourth loops.

3. The combination set forth in claim 1 wherein
the first and third loops define a first closed loop with the spacer member near one vertical end of the spacer member and the second and fourth loops define a second closed loop with the spacer member near the other vertical end of the spacer member.

4. In combination for staking a plant in a pot,
means spaced vertically and partially defining first and second loops for receiving and holding the plant,
first means disposed between the first and second spaced loops to brace the loops,
means spaced vertically and partially defining third and fourth spaced loops for receiving and holding the stake,
second means disposed between the third and fourth spaced loops to brace the loops,
a spacer member disposed between the first and second loops and between the third and fourth loops to define compartments between the first and second loops and between the third and fourth loops respectively to receive and retain the plant and the stake wherein, openings are provided in the spacer member to provide a circulation of air, water and nutrients between the first and second loops and between the third and fourth loops and to provide an opportunity for the roots of the plant to spread, and
the first and second loops and the spacer member and the third and fourth loops are made from a single member and the first and second loops and the third and fourth loops are pivotable on the spacer member.

5. The combination set forth in claim 4 wherein
the third and fourth loops are respectively disposed within the first and second loops before the loops are pivoted on the spacer member.

6. The combination set forth in claim 5 wherein
each of the first and second bracing means constitutes a separate member.

7. The combination set forth in claim 4 wherein
the first and second loops are disposed near one vertical end of the spacer member and are pivotable in opposite directions relative to the spacer member and the third and fourth loops are disposed near the opposite vertical end of the spacer member and are pivotable in opposite directions.

8. In combination for staking a plant in a pot,
means spaced vertically and partially defining first and second loops for receiving and holding the plant,
means spaced vertically and partially defining third and fourth loops for receiving and holding a stake,
a spacer member disposed between the first and second loops and between the third and fourth loops,
means for bracing the loop in fixed relationship to the spacer member,
the first and third partial loops are continuations of each other to define a single closed loop and the second and fourth partial loops are continuations of each other to define a single closed loop,
the first and third partial loops are supported at one end of the spacer member and the second and fourth partial loops are supported at the other end of the spacer member,
the bracing means includes a pair of braces extending between the first and second loops and between the third and fourth partial loops at spaced positions along the loops and in spaced relationship to the spacer member, and
a positioning wall is spaced from the spacer member to define a receptacle for receiving the stake.

9. The combination set forth in claim 8 wherein
the spacer member is provided with at least one opening and the first, second, third and fourth loops are open to facilitate the circulation of air, water and nutrients through the pot.

10. The combination set forth in claim 8 wherein
holes are provided in various ones of the closed loops, the spacer member, the braces and the positioning wall and detents are provided in other ones of the closed loops, the spacer member, the braces and the positioning wall in cooperative relationship with the holes to retain the closed loops, the spacer member, the braces and the positioning wall in an assembled relationship.

11. In combination for staking a plant in a pot,
means defining a spacer member for disposition at an intermediate position in the pot,
means defining with the spacer member first and second loops at a pair of vertically spaced positions, to receive and hold the plant, the second loop being disposed substantially directly below the first loop and being provided with a reduced diameter relative to that of the first loop,
means defining with the spacer member third and fourth loops at a pair of positions directly below each other and respectively disposed in horizontally disposed relationship to the first and second loops to receive and hold the stake wherein the third and fourth loops are disposed on the opposite side of the spacer member from the first and second loops,
the first and third loops define a first closed loop with the spacer member near one vertical end of the spacer member and the second and fourth loops define a second closed loop with the spacer member near the other vertical end of the spacer member,
the spacer member, the first and second loops and the third and fourth loops are formed from a single member, and
the first and third loops are respectively pivotable in first and second opposite directions near the first end of the spacer member and the second and fourth loops are respectively pivotable in the second and first opposite directions near the other end of the spacer member.

12. The combination set forth in claim 11 wherein
the first, second, third and fourth loops are constructed to provide a planar relationship with the spacer member in one pivotable disposition and the third and fourth loops are respectively constructed to be disposed within the first and second loops in such pivotable disposition.

13. In combination for staking a plant in a pot,
means spaced vertically and partially defining first and second loops for receiving and holding the plant,
means spaced vertically and partially defining third and fourth loops for reveiving and holding a stake,
a spacer member disposed between the first and second loops and the third and fourth loops, means for bracing the loops in fixed relationship to the spacer member, the bracing means includes a first brace disposed between the first and second loops and a second brace disposed between the third and fourth loops, and means are provided in the fourth loop for obtaining adjustments in the width of the apparatus near the bottom of the apparatus.

14. The apparatus set forth in claim 13 wherein the fourth loop is extended and is provided with weak points at progressive positions along its extended length to facilitate a reduction in such length to a selected value.

* * * * *